UNITED STATES PATENT OFFICE.

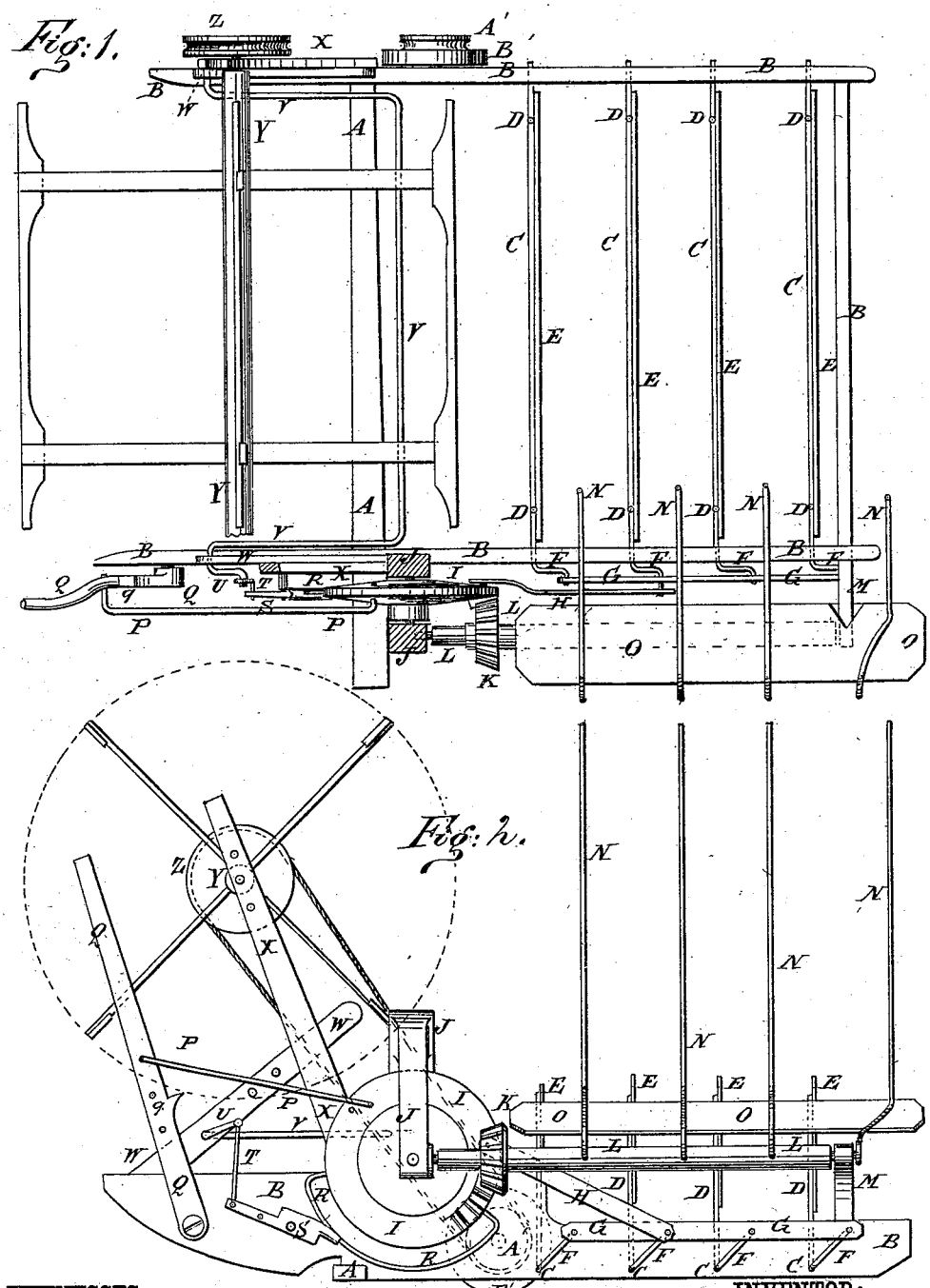

WILLIAM H. AKENS, OF PENN LINE, PENNSYLVANIA.

IMPROVEMENT IN HARVESTER-DROPPERS.

Specification forming part of Letters Patent No. 204,698, dated June 11, 1878; application filed December 7, 1877.

*To all whom it may concern:*

Be it known that I, WILLIAM HARRISON AKENS, of Penn Line, in the county of Crawford and State of Pennsylvania, have invented a new and useful Improvement in Side-Delivering Droppers for Reapers, of which the following is a specification:

Figure 1 is a top view of my improved device, partly in section, to show the construction. Fig. 2 is a side view of the same.

Similar letters of reference indicate corresponding parts.

The object of this invention is to furnish an improved device for attachment to the finger-bar of a reaper, to receive the grain and deliver it in gavels at the side of the machine, so as to be out of the way when making the next round, which shall be so constructed that when attached to the finger-bar of a mower it will convert it into a harvester, and which shall be simple in construction, convenient in use, and reliable in operation.

The invention consists in the combination of the cam, the lever, and the connecting-rod with the wheel that operates the plates and fingers, and with the crank of the bail or cut-off, as hereinafter fully described.

A represents the finger-bar of a reaper or mower, to which are bolted or clamped the side bars of the platform-frame B.

To the side bars of the frame B are pivoted rods or shafts C, to which are rigidly attached arms D, having plates E attached to them.

Upon the inner ends of the shafts or rods C are formed, or to them are attached, small cranks F, which are pivoted to the connecting-bar G.

To the connecting-bar G, toward its forward end, is pivoted the rear end of a connecting-bar, H, the forward end of which is pivoted to a crank-pin attached to the wheel I. The wheel I is pivoted to a bracket, J, attached to the forward part of the inner side bar of the frame B.

Upon the wheel I is formed a section of gear teeth, which mesh into the teeth of the small gear-wheel K attached to the shaft L. The shaft L revolves in brackets J M attached to the inner side bar of the frame B, and to it are attached a number of rods or fingers, N, which are curved inward and downward, incline downward and outward, and are bent outward, so as to lie beneath the plates E.

The inclined parts of the fingers N may have a plate, O, attached to them to keep them in place and keep the grain from the shaft L.

To the wheel I, or to a crank-pin attached to said wheel, is pivoted the rear end of a connecting-rod, P, the forward end of which is pivoted to the lever Q.

The lower end of the lever Q is pivoted to the forward part of the inner side bar of the frame B, and its upper end projects into such a position that it may be conveniently reached and operated by the driver.

To the edge of the wheel I is attached, or upon it is formed, a cam, R, which, as the said wheel is revolved, strikes against the rear end of the lever S, and operates it. The lever S is pivoted to the inner side bar of the frame B, and to its forward end is pivoted the lower end of the connecting-rod T, the upper end of which is pivoted to a short crank, U, formed upon the end of the bail or cut-off V.

The end of the bail V works in bearings in the inclined braces W of the reel-posts X, and its arms are made of such a length that its middle part may rest upon the finger-bar A, the said arms serving as cut-offs and guards to keep the grain from escaping at the sides.

Upon the rear side of the lever Q is formed a projection or cam, q, to strike against the crank U and operate it to push the bail V down upon the finger-bar A, and hold it there until the said lever Q is operated.

The lower ends of the braces W are rigidly attached to the forward ends of the side bars of the frame B, and several holes are formed in their upper parts to receive the bolts by which they are connected with the reel-posts, so that the reel can be adjusted for longer or shorter grain by adjusting the said bolts.

The lower ends of the reel-posts X are bolted to the side bars of the frame B.

To the upper parts of the reel-posts X is pivoted the shaft Y of the reel. To the outer end of the reel-shaft Y is attached a pulley, Z, to receive a band or chain, which also passes around a pulley, A', attached to or formed upon the wheel B'. The wheel B' revolves upon a journal attached to the outer side bar of the frame B, and carries the outer end of the platform. The reel is thus entirely independent of the driving mechanism of the machine.

With this construction, when a sufficient quantity of grain has been cut to form a gavel, the driver moves the upper end of the lever Q forward. The first effect of this movement is to raise the bail or cut-off V to receive and hold the falling grain, and at the same time turn the plates E into a vertical position, carrying the cut grain to the rearward.

As the plates E come into an erect position, the teeth of the wheel I engage with the teeth of the gear-wheel K, turning the shaft L and raising the fingers N, which causes the cut grain to slide from the said fingers N to the ground. The upper end of the lever is then moved to the rearward, which first lowers the fingers N, and then the plates E and bail V.

Having thus described my invention, I claim as new and desire to secure by Letters Patent—

The combination of the cam R, the lever S, and the connecting-rod T with the wheel I, that operates the plates E and fingers N, and with the crank U of the bail or cut-off V, substantially as herein shown and described.

WILLIAM HARRISON AKENS.

Witnesses:
O. H. CRAM,
R. P. MILLER.